United States Patent [19]

Rajewski

[11] Patent Number: 5,042,582
[45] Date of Patent: Aug. 27, 1991

[54] HORIZONTAL HEATER/TREATER AND/OR VAPOR TIGHT OIL BATTERY

[75] Inventor: Robert K. Rajewski, Donalda, Canada

[73] Assignee: Enserv Corporation, Calgary, Canada

[21] Appl. No.: 570,306

[22] Filed: Aug. 20, 1990

[51] Int. Cl.⁵ .............................................. E21B 43/00
[52] U.S. Cl. ................................... 166/267; 166/75.1; 137/172; 137/175; 137/208
[58] Field of Search ................. 166/75.1, 79, 267, 379; 137/172, 173, 175, 176, 179, 198, 206, 208

[56] References Cited

U.S. PATENT DOCUMENTS

| | | | |
|---|---|---|---|
| 1,856,197 | 5/1932 | Southgate | 166/267 |
| 4,233,154 | 11/1980 | Presley | 166/267 |
| 4,547,149 | 10/1985 | Chaudot | 166/267 |
| 4,597,437 | 7/1986 | McNabb | 166/79 |
| 4,779,677 | 10/1988 | Cobb | 166/79 |
| 4,880,040 | 11/1989 | Pierson et al. | 166/267 |

OTHER PUBLICATIONS

Disclosure, Mack & Mann/Enserv Corp., Batt Oil Processing Unit.

Primary Examiner—Ramon S. Britts
Assistant Examiner—Roger J. Schoeppel
Attorney, Agent, or Firm—Anthony R. Lambert

[57] ABSTRACT

A horizontal vapor tight oil battery assembly includes a single, large size, combination separation and production tank for connection to a well-head. The separation of gas and water from oil and holding of the production oil all occurs within the same chamber. In one form, the combination separation and production tank is mounted on skids, and in another form, is adapted to be installed underground. The separation and production tanks are preferably adapted from surplus pressurized tank cars. Treaters may be used in association with the combination separation and production tank.

16 Claims, 4 Drawing Sheets

FIGURE 1 'PRIOR ART'

HORIZONTAL HEATER/TREATER AND/OR VAPOR TIGHT OIL BATTERY

FIELD OF THE INVENTION

This invention relates to equipment used for environmental protection at oil well-heads and in particular, to a new oil battery for connection to a well-head or to a well where vapour tight operation is required.

BACKGROUND OF THE INVENTION

Oil emerging from the ground at a well-head is pressurized and often includes dissolved gas. It is necessary to separate as much of this gas from the oil as possible before the oil is transported away from the well-head.

Conventionally, an oil-gas separator at a well-head includes a separation tank connected to the well-head, a gas boot connected to the separation tank and a production tank connected to the gas boot. The separation tank and gas boot are connected by lines to a flare stack. The separation tank typically has a capacity of about 1½ barrels of oil and a production tank a capacity of about 400 barrels. Gas separating from the oil in a production tank cannot enter the flow line to the flare stack because the production tanks have a maximum allowable pressure of about 8 ounces, less than that in the flow line, and any pressure above this is released through a valve to ensure that the tanks do not burst or split from pressure build-up.

These conventional devices suffer the following difficulties:

(a) Due to the design of standard production tanks, vapour break-out is difficult to control, and normally exceeds government regulations. Government monitoring bodies have recognized the difficulty of economically meeting their regulations and have a policy of not enforcing the regulations except in extreme cases.

(b) The exposure of numerous connections to the environment results in increased risk of freeze-up in cold weather, particularly in northern latitudes.

(c) The large number of connections requires extensive set-up and take down procedures often lasting more than a day.

(d) With three tanks, dumping is more difficult, and the interconnections are subject to sludging and general maintenance difficulties.

SUMMARY OF THE INVENTION

Although these difficulties have been known for some time, an economical solution has not been found before the present invention. The present invention substantially solves the problems with conventional separators and provides, in one embodiment, a vapour tight oil battery assembly for connection to a well-head, the vapour tight oil battery assembly comprising:

inlet means connectable to the well-head;

a separation tank connected to the inlet means connectable to the well-head;

a separation tank connected to the inlet means, the separation tank being vapour tight and having sufficient capacity to function as a production tank;

a pressure relief valve connected to the separation tank for allowing release of gas pressure over a pre-set pressure;

the separation tank including a first outlet for removing oil from the separation tank and a second outlet for removing water from the tank;

the separation tank including a second outlet; and a gas line having a back pressure valve set at a pressure lower than the pre-set pressure for removing gas from the separation tank, the gas line being connected to the third outlet and being connectable to a flare stack.

In another embodiment, a pair of such separation tanks are connected together.

In another embodiment, the invention includes a baffle, to separate oil and water on one side of the baffle from oil on the other side, and a water removal outlet for removing water from the one side of the baffle.

In a still further embodiment, the vapour tight oil battery assembly may also include a heater, and when used with a baffle, the heater will be disposed on the water accumulation side of the baffle. Further, the vapour tight oil battery assembly may include a degasser on the water accumulation side of the baffle, the degasser extending out of the separation tank.

DESCRIPTION OF THE FIGURES

There will now be described preferred embodiments of the invention, with reference to the drawings for the purposes of illustration, in which like numerals denote like elements and in which.

DESCRIPTION OF THE PREFERRED EMBODIMENTS

The invention will now be described in more detail, but firstly, for greater appreciation of the advance made by the inventor, a conventional oil-gas separator will be described.

Figure 1:
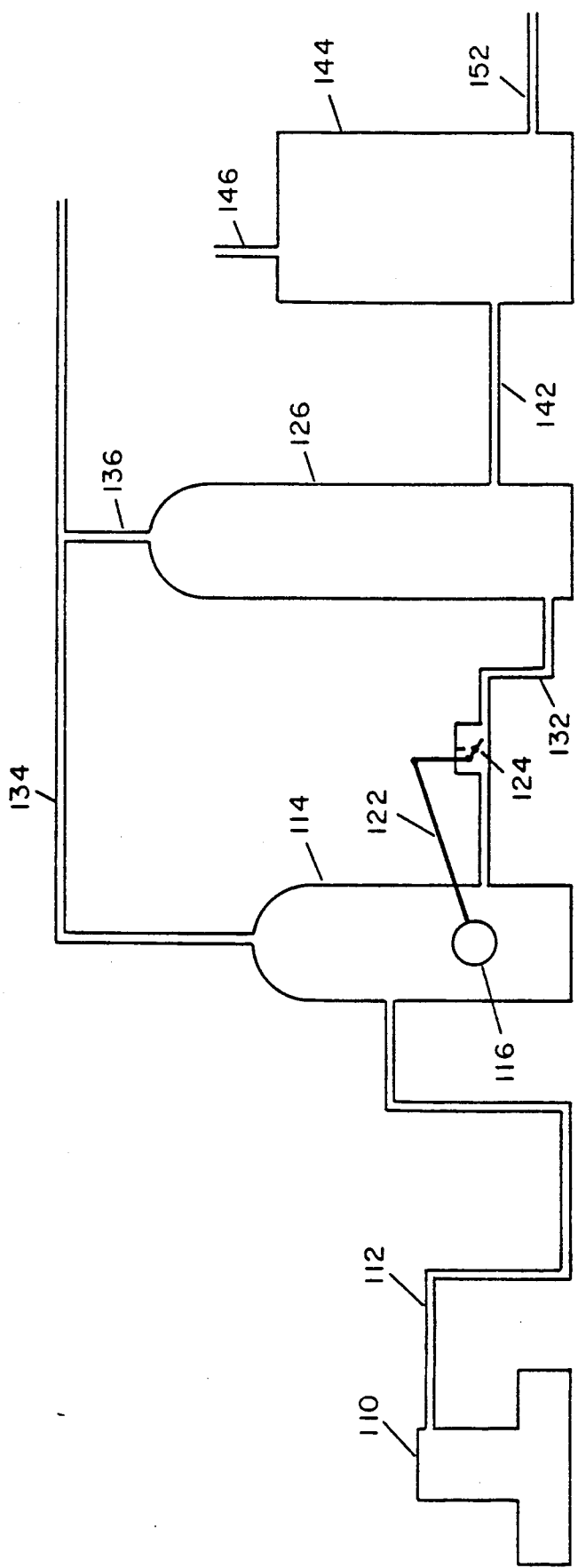
FIG. 1 shows a schematic of a prior art oil battery oil assembly including separation tank, gas boot and production tank.

Referring to FIG. 1, oil emerging from the well-head 110 passes through line 112, to separation tank 114. As separation tank 114 fills up with oil, float 116 on arm 122 activates dump value 124 and the oil is dumped into gas boot 126 through a line 132 connected between the separation tank 114 and gas boot 126. Gas separating from the oil in separation tank 114 enters a flare line 134 exiting from the top of the gas boot 126. Flare line 134 runs out through a flare stack (not shown). A pop-off valve (not shown) but connected to the top of the separation tank 114 is connected to a pop-off tank (not shown) to provide for release of excess gas pressure from the separation tank 114, which may occur, for example, if line 134 freezes or plugs.

Further gas is released from gas boot 126 through line 136. Production oil passes continuously through the gas boot 126, into a line 142 connected between gas boot 126 and production tank 144. The production oil passes into the production tank 144. Oil remains in the production tank 144 until it is pumped out of load line 152 located at a low point on the production tank 144. Production tank 144 is provided with a low pressure pop-off valve 146 typically set at 8 ounces of pressure, and the load lines 152 include a dump valve (not shown) for releasing oil from the production tank to a tank truck.

Separation tank 114 is vapour tight and typically has a 1½ barrel capacity and is not used as a holding or production tank. Production tank 144 typically has a capacity of 400 barrels, is used to hold oil pending servicing and is not vapour tight.

Since a typical well-head has a flow rate of about 100 barrels per day, the production tank 144 needs to be emptied once every three or four days. Production tank 144 typically has a maximum pressure of 8 ounces. Gas from the production tank 144 cannot be released into the flare line 134 because of the high pressure of this flare line 134 and it is typically released into the atmosphere where it causes an environmental concern and may cause safety problems.

Figure 2:
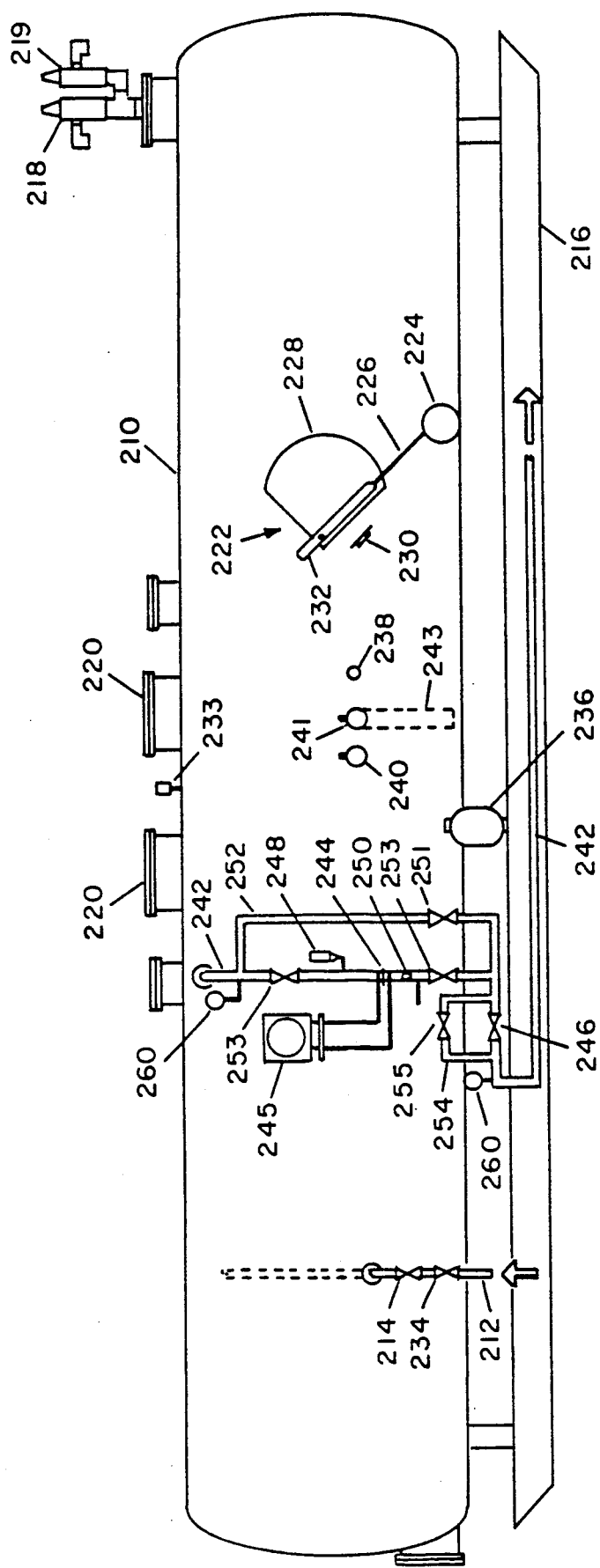
FIG. 2 shows a schematic of an oil battery assembly according to the invention.

Referring now to FIG. 2, which is not to the same scale as FIG. 1, there is shown an embodiment of the present invention. Oil from a well-head (not shown) enters the tank 210 through inlet line 212, having ball valve 214, which is well known in the art. Inlet line 212 may be flexible or rigid depending upon hook-up requirements, and is connected to an opening in the tank 210. Tank 210 is preferably a vapour tight pressurized tank car available from any of numerous railway car operators such as CGTX.

The rebuilding of the pressurized tank car to make tank 210 is as follows. The track assembly (not shown) and main frame for the wheels (not shown) are removed from the tank, and replaced by skids 216. An internal bulkhead, which previously provided for separation of the pressurized tank car into two compartments, is pierced to allow equalization of oil and gas in the two compartments of the tank 210. Ladders (not shown) are left on the pressurized tank car.

The tank 210 is provided with a high pressure pop-off valve 218 set for example at 14 psi (or as required by local or federal regulations), and may include a further relief valve 219 set at 40 psi. The pop-off valve 218 is readily commercially available and replaces the valve previously used on the pressurized tank car. The pop-off valve 218 is preferably connected to a gas line (not shown) running out to a flare stack (also not shown but may be as provided by Stettler Oilfield Manufacturing Ltd of Stettler, Alberta, Canada). The pop-off valve 218 is required by government regulations. Since it is an emergency valve, it may never be used. It is most likely to be used at start-up to allow for sudden pressure surges or during winter if some part of the gas outlet (described later) freezes. During summer or in warm conditions freeze up is relatively unlikely, rendering the gas line to the flare stack from the pop-off valve 218 inessential for environment protection.

The pressurized tank car normally has two man-ways for access to the two pressurized compartments. In FIG. 2 is shown two man-ways 220 in the central upper portion of tank 210, by way of example. The hatches of the man-ways 220 on the pressurized tank cars should be checked to ensure that the rubber seal around the hatches is adequate. Man-ways 220 are provided to allow entry into the inside of the tank 210 for maintenance and cleaning.

Non-freezing tank gauge 222 is provided at a middle portion of the tank 210 to show the level of oil in the tank 210. The tank gauge 222 includes a float 224 held in place by any of various means to the base of a float arm 226. The float arm 226 pivotally attaches to a gauge board 228. Microswitch 230 is triggered by the end 232 of the float arm 226 when the tank 210 is full. A signal from the microswitch 230 is sent to a pilot valve 233 on a flow line (not shown) from the propane tank 236. Closure of the valve interrupts the flow of propane to the ESD valve 234, which is kept open by continuous pressure from the propane tank 236. Closure of the ESD valve 234 shuts down the flow from the wellhead when the tank 210 is full. The use of a continuous pressure ESD valve helps to ensure fail safe operation of the tank 210.

Alternatively, the gauge could consist of a float attached to a 3" stainless steel rod which protrudes up through a 2" nipple (not shown) in the top of the tank 210 together with a steel rod (not shown) of reduced cross-section inserted into a $\frac{1}{8}$" plexi-glass gauge cover. The gauge cover in this case is attached to the top of the tank 210 with a pressure seal and prevents leaks from the tank 210. The inside of the gauge cover houses a gauge board calibrated up to, as shown in this example, 80 cubic meters. In this alternative, other means for shutting off the wellhead inlet, as are well known in the art, may be used. For sampling of the tank 210, a ball valve 238 is provided in the side of the tank 210.

Two outlets consisting of high level load line 240 and low level load line 241 with stinger 243 to reach the bottom of tank 210 are provided for unloading production oil and water from the tank 210. Outlet line 242 is connected to an outlet in the upper portion of tank 210 and provides an outlet for gas to the flare stack through meter run 244, with pen recorder 245 and back pressure valve 246. The back pressure valve 246 maintains the pressure on tank 210, and may be set for example at 4 psi or some other suitable pressure, less than the pressure setting of the high pressure pop-off valve 218. The actual pressure setting of the pressure relief valve 246 depends on the desired flow rate of oil into the tank 210 and is adjusted to allow an acceptable flow rate of oil into the tank 210 and gas to the flare stack without creating excess pressure in the tank 210.

Both meter run 244 and back pressure valve 246 are readily commercially available. The meter run 244 measures the pressure differential on either side of an orifice to determine the amount of gas released from the oil into the flare stack (not shown). Methanol may be injected into the line 242 at swage and cap 248 from a methanol source (not shown) to prevent freeze-up in the outlet line 242, meter 244 and back pressure value 246 if weather conditions require it. Standard fittings, including bypasses 252 and 254, may also be used in conjunction with the outlet line 242. Bypass 252, which can be shut off with ball valve 251, allows for maintenance to be carried out on the meter run 244 by isolating it with the ball valves 253. Bypass 254 with ball valve 255 allows for bleeding of the tank 210 to zero pressure, which is desirable if the back pressure valve 246 has a low pressure point above zero pressure. Gauges 260 may be used for testing the pressure within the tank 210. Thermometer 250, is provided in the outlet line 242 to indicate the temperature of the fluid in the outlet line.

As shown in FIG. 2, the tank 210 is mounted on skids 216 for convenient transportation and installation. On installation, the only lines that require hook-up are the inlet line 212 from the well-head and the outlet line 242 (and the outlet line from the pop-off valve 220 if one is required) to the flare stack. Typically on installation, the well-head and flare stack are already in place. For a well that has sufficient pressure to maintain a flow of oil from the well-head, the oil battery is connected directly to the well-head. Where a pump is used, the tank 210 is connected directly to the pump jack. Any of various flare stacks may be utilized along with the oil battery, as noted above, and it is desirable to set the tank 210 up at least 50 meters from the flare stack for safety reasons.

Typical installation of the oil battery takes about 3 hours.

The tank 210 may be installed underground. In that case, the pop-off valve 218, man-way 220 and load lines 240 and 241 are each elongated to allow for the depth of burial of the tank 210, which for efficient protection from the environmental conditions should be 6 feet. The tank gauge should be of the sliding rod type and at least 8 feet long to allow for the additional depth of the tank 210. Tank 210 is preferably coated with cold tar epoxy to prevent corrosion from ground fluids.

The preferred size of tank 210 is a 52 foot long pressurized tank having a capacity of 80 cubic meters (about 550 barrels). For some wells, however, where flow rates are low, a 40 foot tank 210 with 35 cubic meter capacity may be sufficient. Alternatively, two of the smaller sized tanks 210 could be hooked together with a connecting line to equalize fluid and gas pressure between the two tanks 210.

The required volume of the tank 210 depends on the flow rate of the oil well and the frequency of servicing. The tank 210 functions as both an oil/gas separation tank and production tank and is both vapour tight and of sufficient size to function as a production tank. With a well-head flow rate of 100 barrels per day, the preferred volume of tank 210 is greater than 500 barrels, to allow for servicing each four or five days.

Figure 3:
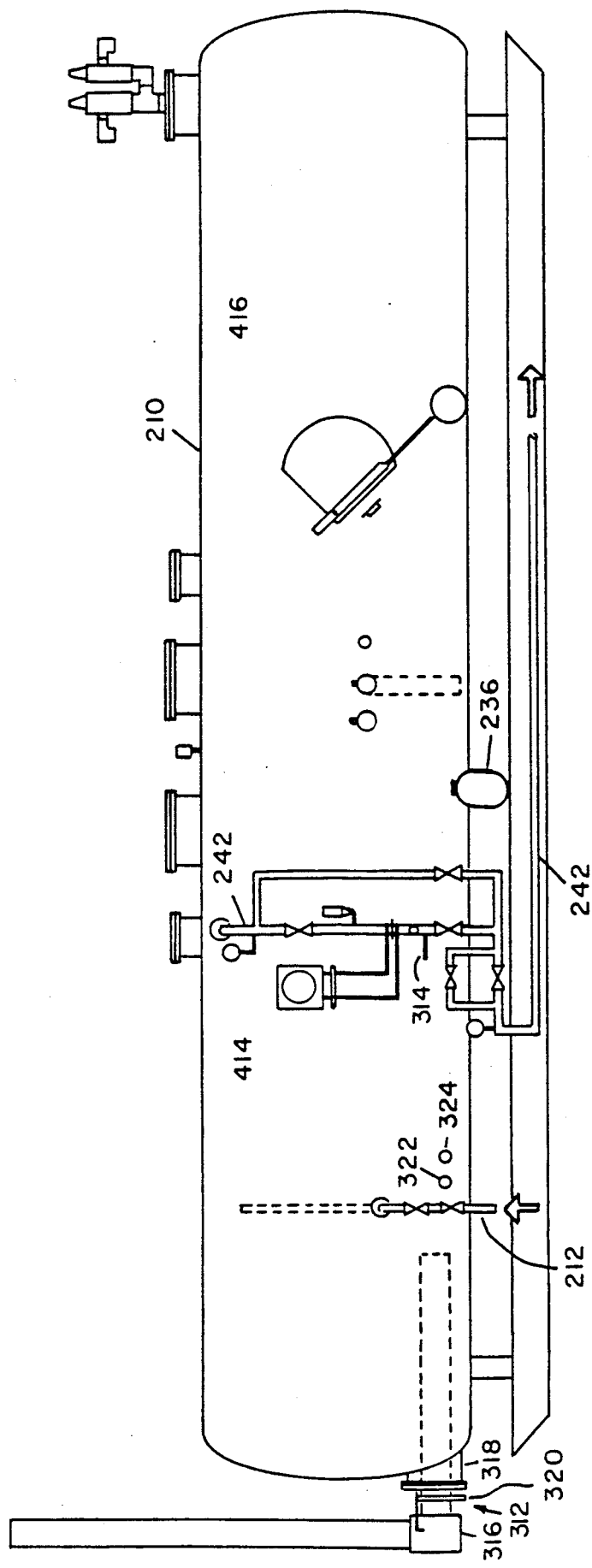
FIG. 3 shows a schematic of an oil battery assembly according to the invention including a heater.

An alternative embodiment of the invention is shown in FIG. 3, in which features that are similar to those shown in FIG. 2 have been indicated with like numerals, to which the same description applies as set out above. Tank 210 is shown with a heater unit 312 that operates using gas fed from the outlet line 242 through connection 314, and appropriate modifications have been made to the tank 210.

Burner tube 316 is attached to the tank 210 at access port 318, and includes a burner tube pilot of any of various constructions such as the TORNADO TM burner tube constant ignition pilot 320 of Stettler Oilfield Manufacturing Ltd. The burner tube may be an ENARDO TM burner with 10" U-tube. A connection 322 is provided for a temperature controller (not shown) for control of the temperature of the fluid in the tank 210. A connection 324 is also provided for a thermometer (not shown) to indicate the temperature of the fluid in the tank 210.

In a further alternative embodiment, tank 210 may be used as or in association with a treater. In this embodiment, one compartment of an 80 cubic meter tank 210 may be used as the production tank, and one compartment for the treater, with a line connecting the two compartments. In another embodiment, two tanks 210 may be placed side by side, one to be used as a combination separation/production tank and one to be used as the treater, with a line connecting the two, and with at least one pop-off valve, an outlet line to the flare stack with meter and back-pressure valve, gauge for each tank and an oil outlet from each tank, all of which features are similar to those described for the embodiment of FIG. 2.

Figure 4:
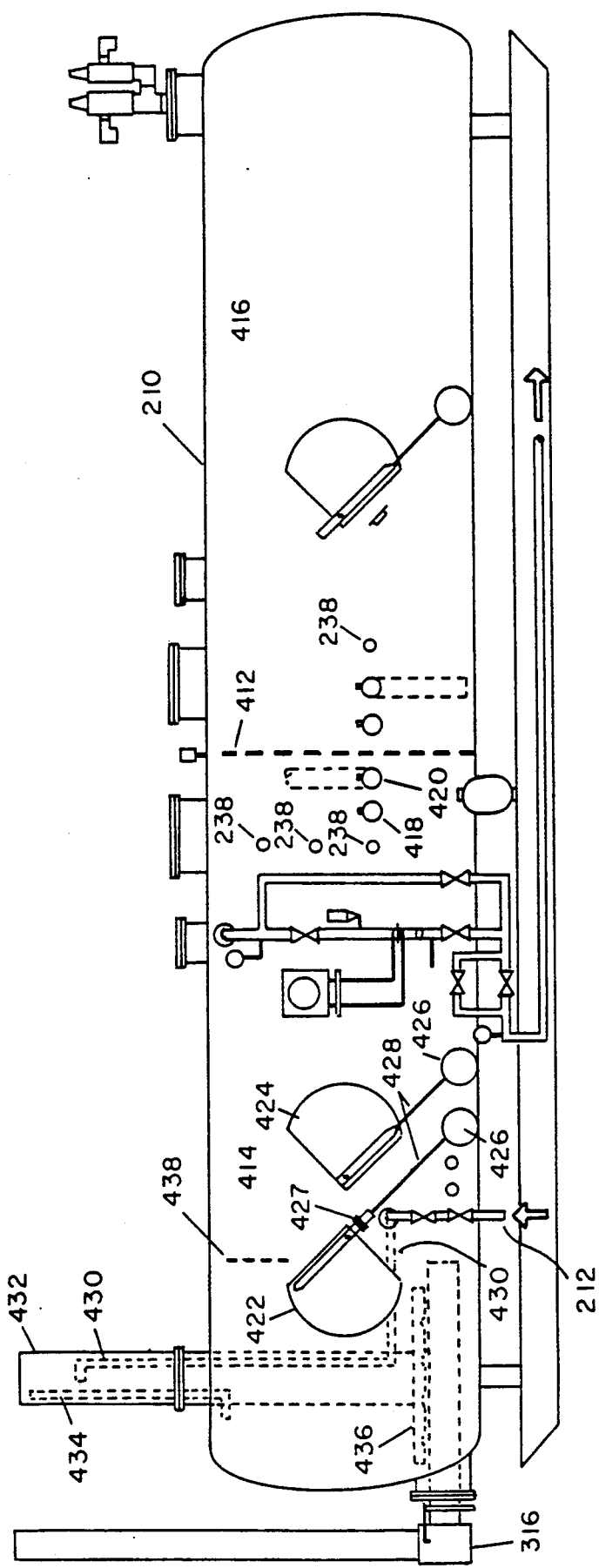
FIG. 4 shows a schematic of an oil battery assembly according to the invention incorporating a treater.

Referring to FIG. 4, in which features that are similar to those shown in FIGS. 2 and 3 have been indicated with like numerals, to which the same description applies as set out above, tank 210 is separated into two parts by a divider 412. Compartment 414 is used for holding water, while oil passes over the top of the separator into compartment 416 for storage. A water load line 418 is provided for unloading water from the compartment 414. An oil top off load line 420 is provided to remove oil that remains in the compartment 414. Gauge boards 422 and 424, each having floats 426 and float arms 428 are provided for determining the level of the water and oil in the compartment 414. Gauge board 422 is provided with an interface weight 427 so that the float 426 floats on the interface between the oil and water in the compartment 414. Additional ball valves 238 are provided for sampling oil and water in the compartment 414.

Inlet means such as line 212 supplies oil (an oil/water mix) from the wellhead to the internal transfer line 430 which releases the oil into the degasser and downcomer 432. The degasser 432 is provided with an internal flow line 434 for return of the gas from the degasser to the tank 210. At the lower end of the degasser 432 is a spreader pan 436. Oil entering the degasser 432 from the well-head is released in the degasser and falls to the bottom where it exits under and in the center of the spreader pan 436. As the oil migrates out from the center of the spreader pan 436 through the surrounding water, the water in the oil beads and mixes with the water already in the tank 210. The degasser 432 therefore must be sufficiently long to provide sufficient hydrostatic head to force the oil in the degasser 436 into the tank 210. An internal baffle plate 438 is provided to reduce misting.

A burner 316, as described in the discussion of FIG. 3, has been shown in FIG. 4 with the burner tube extending under the spreader pan 436. The choice of which of the embodiments of FIGS. 2, 3 and 4, to use, for example whether to include a heater, will depend in part on the wetness of the oil emerging from the wellhead.

Some of the conventional components which have been used by the inventor in carrying out the invention, which are in any event well known in the art, include a BARTON TM 2 pen recorder which comes with a 3 valve manifold, available from ITT Corporation of New York, U.S.A., as the meter run 244 and pen recorder 245; a 3" KIMRAY TM back pressure valve, available from Kimray Inc. of Oklahoma, U.S.A., for the back pressure valve 246 (an INVALCO TM valve available from Invalco, Inc. of Tulsa, Okla., U.S.A., for example, is also acceptable); a 2" thread NORRISEAL TM 1500# motor valve, available from Dover Corporation (Canada) Ltd. of Edmonton, Canada, for the ESD valve 234; a 2" thread MERCER TM release valve; available from the Mercer Valve Company Inc., for the pressure relief valve 218; a 2" thread WELLMARK TM relief valve, available from Wellmark of Oklahoma, U.S.A., for the pressure relief valve 219.

It will be appreciated that skilled persons in the art could make immaterial modifications to the preferred embodiments described here, without departing from the invention.

I claim:

1. A horizontal vapour tight oil battery assembly for connection to a well-head, the vapour tight oil battery assembly comprising:
   inlet means connectable to the well-head;
   a separation tank connected to the inlet means, the separation tank being vapour tight and having sufficient capacity to function as a production tank;
   a pressure relief valve connected to the separation tank for allowing release of gas pressure over a pre-set pressure;

the separation tank including a first outlet for removing oil from the separation tank and a second outlet for removing water from the tank;

the separation tank including a third outlet; and a gas line having a back pressure valve set at a pressure lower than the pre-set pressure for removing gas from the separation tank, the gas line being connected to the third outlet and being connectable to a flare stack.

2. The vapour tight oil battery assembly of claim 1 in which the separation tank has a capacity of greater than about 80 cubic meters.

3. The vapour tight oil battery assembly of claim 1 in which the separation tank has a capacity of greater than about 35 cubic meters.

4. The vapour tight oil battery assembly of claim 1 in which the assembly is adapted for installation underground.

5. The vapour tight oil battery assembly of claim 1 in which the assembly is mounted on skids.

6. The vapour tight oil battery assembly of claim 1 in which the separation tank includes a baffle, to separate oil and water on one side of the baffle from oil on the other side, and a water removal outlet for removing water from the one side of the baffle.

7. A horizontal vapour tight oil battery assembly for connection to a well-head, the vapour tight oil battery assembly comprising:

inlet means connectable to the well-head;

a first vapour tight separation tank connected to the inlet means, the first separation tank having sufficient capacity to function as a production tank;

a second vapour tight separation tank connected to the first separation tank, the second separation tank having sufficient capacity to function as a production tank;

pop-off valve means connected to at least one of the first and second separation tanks for allowing excess pressure over a pre-set pressure to be removed from the first and second separation tanks;

first outlet means connected to the first separation tank for removing oil from the first separation tank;

second outlet means connected to the first separation tank for removing water from the first separation tank;

third outlet means connected to at least one of the first and second separation tanks for removing gas from at least one of the first and second separation tanks without releasing the pressure from the separation tanks;

fourth outlet means connected to the second separation tank for removing oil from the second separation tank;

fifth outlet means connected to the second separation tank for removing water from the second separation tank; and a gas line connected to the third outlet means, the gas line having a back pressure valve set at a pressure lower than the pre-set pressure, and the gas line being connectable to a flare stack.

8. In a horizontal vapour tight oil battery assembly for connection between an oil line from a well-head and a gas line connected to a flare stack, the gas line to the flare stack including a back pressure valve, the improvement comprising a separation tank having sufficient capacity to function as a production tank, the separation tank being vapour tight, being connectable to the oil line from the well-head and connectable to the gas line to the flare stack, the separation tank including a pressure relief valve and high and low level outlets for the removal of oil and water from the separation tank respectively.

9. In the vapour tight oil battery assembly of claim 8, the improvement further comprising the separation tank having a capacity of greater than about 80 cubic metres.

10. In the vapour tight oil battery assembly of claim 8, the separation tank further including a baffle to separate oil and water on one side of the baffle from oil on the other side and a water outlet for removing water from the one side of the baffle, the high and low level outlets being on the other side of the baffle.

11. The vapour tight oil battery assembly of claim 1 further including a heater unit for heating the oil in the separation tank, the heater unit being disposed in one end of the separation tank.

12. The vapour tight oil battery assembly of claim 6 further including a heater unit for heating the oil in the separation tank, the heater unit being disposed on the one side of the baffle.

13. The vapour tight oil battery assembly of claim 12 further including a degasser connected to the inlet means, the degasser disposed within the separation tank, and extending out of and above the separation tank.

14. The vapour tight oil battery assembly of claim 8 further including a heater unit for heating the oil in the separation tank, the heater being disposed at one end of the separation tank.

15. The vapour tight oil battery assembly of claim 10 further including a heater unit for heating the oil in the separation tank, the heater unit being disposed in the separation tank on the one side of the baffle.

16. The vapour tight oil battery assembly of claim 15 further including a degasser connected to the oil line from the wellhead, the degasser disposed within the separation tank and extending out of and above the separation tank on the one side of the baffle.

* * * * *